(12) United States Patent
Trifonov

(10) Patent No.: US 7,181,011 B2
(45) Date of Patent: Feb. 20, 2007

(54) KEY BANK SYSTEMS AND METHODS FOR QKD

(75) Inventor: Alexei Trifonov, Boston, MA (US)

(73) Assignee: MagiQ Technologies, Inc., New York, NY (US)

( * ) Notice: Subject to any disclaimer, the term of this patent is extended or adjusted under 35 U.S.C. 154(b) by 395 days.

(21) Appl. No.: 10/852,071

(22) Filed: May 24, 2004

(65) Prior Publication Data

US 2005/0259825 A1    Nov. 24, 2005

(51) Int. Cl.
*H04K 1/00*    (2006.01)
(52) U.S. Cl. ........................ 380/256; 380/283; 380/278
(58) Field of Classification Search ................. 380/256
See application file for complete search history.

(56) References Cited

U.S. PATENT DOCUMENTS 5,307,410 A    4/1994    Bennett

OTHER PUBLICATIONS

Elliot et al., Quantum Cryptography in Practice, Aug. 25-29, 2003, SIGCOMM '03 pp. 227-237.*
Pearson et al., On the Optimal Mean Photon No. for Quantum Cryptography, 2003, pp. 1-11.*
Menezes et al., Handbook of Applied Cryptography, 1997, CRC Press, p. 553.*
Hwang et al, "Quantum key distribution with high loss: toward global secure communication,".
Bennett, "Quantum cryptography using any two nonorthogonal states" phys. rev. lett., vol. 68, No. 21 May 25, 1992 (3121-3124).
Pearson et al, "On the optimal mean photon No. for Quantum cryptography," http://ArXIV.org/vc/quant-ph/papers/0403/0403065VI-PH May 17, 2004.
Stucki et al., "quantum key distribution over 67 km with a plug & play system," New Journal of physics, 4(2002) 41.1-41.8 Jul. 12, 2002.
Elliot, "Building the quantum network," New Journal of physics, 4 (2002) 46.1-46.12 Jul. 12, 2002.

* cited by examiner

*Primary Examiner*—Emmanuel L. Moise
*Assistant Examiner*—David J. Pearson
(74) *Attorney, Agent, or Firm*—Opticus IP Law PLLC

(57) ABSTRACT

Key banking methods and systems for quantum key distribution (QKD) are disclosed. A method of the invention includes establishing a primary key bank that stores perfectly secure keys associated with exchanging true quantum pulses between two QKD stations Bob and Alice. The method also Includes establishing a secondary key bank that stores less-than-perfectly secure keys associated with exchanging relatively strong quantum pulses between Bob and Alice. The primary keys are used for select applications such as authentication that are deemed to require the highest security, while the secondary keys are used for applications, such as encrypted bit sifting, that are deemed to require less-than-perfect security. A benefit of the two-key-bank architecture is that exchanging primary and secondary keys actually allows for an increase in the distance over which the primary keys can be securely distributed.

20 Claims, 4 Drawing Sheets

KEY BANK SYSTEMS AND METHODS FOR QKD

FIELD OF THE INVENTION

The present invention relates to quantum cryptography, and in particular relates to advanced systems and methods for generating and managing keys in a quantum key distribution (QKD) system.

BACKGROUND OF THE INVENTION

Quantum key distribution involves establishing a key between a sender ("Alice") and a receiver ("Bob") by using weak (e.g., 0.1 photon on average) optical signals transmitted over a "quantum channel." The security of the key distribution is based on the quantum mechanical principal that any measurement of a quantum system in unknown state will modify its state. As a consequence, an eavesdropper ("Eve") that attempts to intercept or otherwise measure the quantum signal will introduce errors into the transmitted signals, thereby revealing her presence.

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175–179 (IEEE, New York, 1984). Specific QKD systems are described in publications by C. H. Bennett et al entitled "Experimental Quantum Cryptography" and by C. H. Bennett entitled "Quantum Cryptography Using Any Two Non-Orthogonal States", Phys. Rev. Lett. 68 3121 (1992).

The above mentioned publications each describe a so-called "one-way" QKD system wherein Alice randomly encodes the polarization or phase of single photons, and Bob randomly measures the polarization or phase of the photons. The one-way system described in the Bennett 1992 paper and incorporated by reference herein is based on a shared interferometric system. Respective parts of the interferometric system are accessible by Alice and Bob so that each can control the phase of the interferometer. The signals (pulses) sent from Alice to Bob are time-multiplexed and follow different paths. As a consequence, the interferometers need to be actively stabilized to within a nanoseconds or even milliseconds during transmission to compensate for thermal drifts.

U.S. Pat. No. 6,438,234 to Gisin (the '234 patent), which patent is incorporated herein by reference, discloses a so-called "two-way" QKD system that is autocompensated for polarization and thermal variations. Thus, the two-way QKD system of the '234 patent is less susceptible to environmental effects than a one-way system.

The general process for performing QKD is described in the book by Bouwmeester et al., "The Physics of Quantum Information," Springer-Verlag 2001, in Section 2.3, pages 27–33. During the QKD process, Alice uses a true random number generator (TRNG) to generate a random bit for the basis ("basis bit") and a random bit for the key ("key bit") to create a qubit (e.g., using polarization or phase encoding) and sends this qubit to Bob.

The security of a QKD system greatly depends on authentication, which is the process that ensures that the parties communicating with each other over a communication link are who they say they are. In a QKD system, Alice and Bob must be sure they are talking to each other and that there is no man-in-the-middle impersonating Bob or Alice. This problem is addressed by authentication, which is essentially classical and completely depends on the security of the key on which authentication is based. Unconditionally secure authentication protocols exist, so that if the key used is unconditionally secure the authentication can be made unconditionally secure as well. If the security is compromised, Alice and Bob must recheck they are indeed communicating with each other and not to an eavesdropper in between. They can repeatedly perform authentication if they share keys they can absolutely trust.

The authentication protocol is also the only guarantee that Eve cannot change the data in a classical communication between Alice and Bob. One of the important assumptions in QKD is that Eve can listen to the classical communication but due to authentication she cannot change this communication.

The authentication procedure works as follows. The initial key for authentication is preinstalled by a trusted party. The QKD system is capable of producing keys (it can be treated as key regeneration) thus delivering enough fresh keys for authentication purposes. The security of the new key depends on the security of the QKD protocol. It is proven that this procedure can be made absolutely secure using a single-photon source and an appropriate protocol such as BB84. For most practical QKD systems used to date, a weak coherent pulse source is used. The security of a QKD system that utilizes weak coherent pulses is complicated by the fact that there is a probability that some pulses will have more than one photon per pulse.

Normally, it is supposed that for QKD systems that rely on weak coherent pulses, the QKD procedure is always run with the mean number of photons per pulse ($\mu$) set to a secure level determined by the distance and losses. The main problem with this approach is that longer distances require longer times needed for establishing a key, thus making the key regeneration rate extremely low. This is especially critical because in a real operational regime, a quantum cryptography system needs keys for several purposes-namely, for encrypting messages, for running QKD protocols over public channel, and for authentication. Further, a sufficient number of secure keys need to be stored so that the key distribution process can be securely restarted if necessary.

Figure 1A:
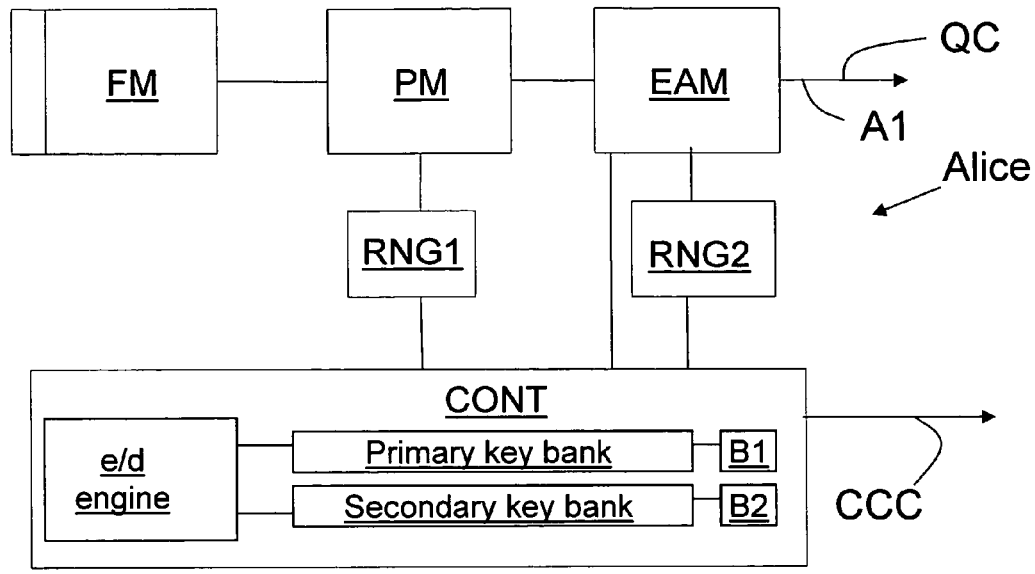
FIG. 1A is a schematic diagram of an example embodiment for Alice for a folded ("two-way") interferometer QKD system, wherein Alice includes a high speed electro-absorption modulator (EAM) rather than a standard variable optical attenuator (VOA), and wherein a true random number generator (RNG2) is connected to the EAM to assure a random choice of the level of attenuation of optical signals (i.e., pulses or bits) sent over the quantum channel to Bob.

The various elements depicted in the drawings are merely representational and are not necessarily drawn to scale. Certain sections thereof may be exaggerated, while others may be minimized. The drawings are intended to illustrate various embodiments of the invention that can be understood and appropriately carried out by those of ordinary skill in the art.

SUMMARY OF THE INVENTION

Prior art QKD systems typically operate at a fixed mean photon number per pulse μ and create one key bank used for all applications (i.e., information to be process). An aspect of the present invention includes using quantum channel pulses having different mean photon numbers to form two sets of keys. A first (primary) set of keys associated with quantum ("weak") pulses represents the highest level of security according to the usual QKD parameters. A second (secondary) set of keys associated with the still quantum but stronger pulses ("strong" pulses) represents less-than-perfect security. The first set of keys is used for applications that require ultimate security (e.g., authentication, encrypting sensitive data, etc.) while the second set of keys is used for applications that require less-than-ultimate security, such as encrypting the classical data using other than one-time-pad protocols, such as AES. In one aspect of the invention, the applications have tags that identify which type of key is to be used.

The method of using two different keys corresponding to weak and strong pulses allows for an increase in distance and/or key generation rates. It also allows for efficient regeneration of keys used for initial authentication purpose, so that the system can be safely restarted without having to distribute a pre-shared authentication key.

Another aspect of the invention is a station for a QKD system. The station includes an optics layer coupled to a controller. The controller includes primary and secondary key banks adapted to store primary and second keys formed from exchanging weak and strong pulses with a second QKD station. The controller further includes an encryption/decryption (e/d) engine coupled to the primary and secondary key banks. The e/d engine is adapted to use keys from either of said primary and secondary key banks to encrypt and decrypt information.

DETAILED DESCRIPTION OF THE INVENTION

The present invention is described in connection with example embodiments of the QKD station, typically referred to as Alice, used in either a one-way or two-way QKD system. Security considerations are examined, and a numerical analysis illustrating the improvement in the key generation rate by exchanging both weak and strong pulses is presented. Then, methods of operation of exchanging keys to form the primary and secondary key banks are set forth, and methods of assigning keys to different applications are discussed. Also, the terms "signals," "pulses" and "bits" are used interchangeably in accordance with the context of the discussion.

Example Embodiments for Alice

FIG. 1A is a schematic diagram of an example embodiment of a QKD station "Alice" suitable for use in a folded ("two-way") QKD system. Alice includes along in optical axis A1 a Faraday mirror FM, a phase modulator PM and a high speed electro-absorption modulator (EAM). The EAM replaces a standard variable optical attenuator (VOA), which generally cannot be switched fast enough to keep up with desired bit rates. A first true random number generator RNG1 is coupled to the phase modulator PM, and a second random number generator RNG2 is coupled to the EAM. RNG1 and RNG2 are coupled to a controller CONT. The controller CONT includes a primary key bank and a secondary key bank for storing primary and secondary keys, as described below.

The controller CONT also includes primary and secondary buffers B1 and B2 for storing raw key information (corresponding to the weak and strong bits) to be operated on and sent on to the corresponding key banks. The controller CONT further includes an encryption/decryption (e/d) engine connected to the primary and secondary key banks and is adapted to receive keys from the primary and secondary key banks and encrypt or decrypt information using the keys provided thereto.

CONT controls the operation of RNG1 and RNG2, wherein RNG2 is sufficiently fast to assure a random choice of the level of attenuation of optical signals sent over the quantum channel to Bob. The controller also records the state of each RNG to "tag" each of the sent bits.

Quantum channel QC carries the weak and strong optical signals between Bob and Alice. A classical (public) communication channel CCC connects the respective controllers of Alice and Bob (Bob's controller not shown). Classical communication channel CCC is used for both synchronization (sync) signals to coordinate the operation of Bob and Alice, and to exchange public messages between Bob and Alice or through Bob and Alice to external devices.

Figure 1B:
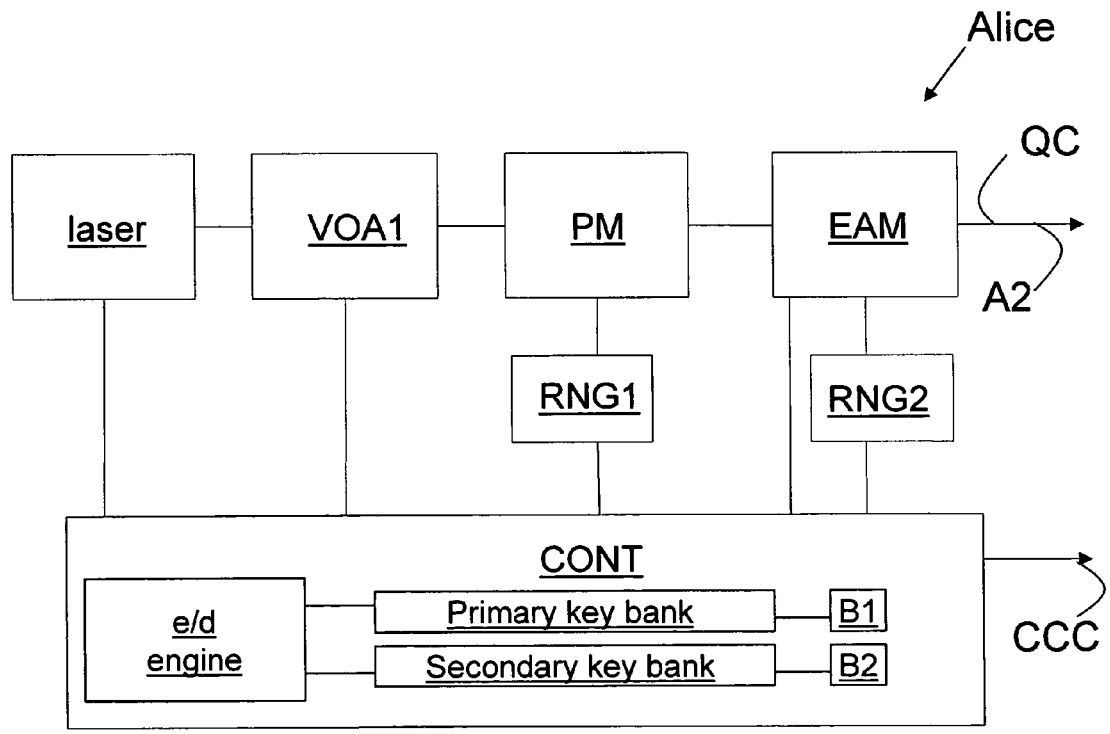
FIG. 1B is a schematic diagram of an example embodiment of Alice for a one-way interferometer QKD system, wherein a high speed electro-absorption modulator (EAM) is coupled to a true random number generator (RNG2) to assure a random choice of the level of attenuation of optical signals (i.e., pulses or bits) sent over the quantum channel to Bob.

FIG. 1B is a schematic diagram of an example embodiment of Alice suitable for use in a one-way interferometric system for QKD. Alice of FIG. 1B includes along an optical axis A2 a laser, a variable optical attenuator VOA1, a phase modulator PM and an EAM. As with Alice of FIG. 1A, a first true random number generator RNG1 is coupled to the phase modulator PM, and a second random number generator RNG2 is coupled to the EAM. RNG1 and RNG2 are coupled to the controller CONT. The controller CONT includes a primary key bank and a secondary key bank for storing primary and secondary keys, as described below. Also, the controller CONT includes primary and secondary buffers B1 and B2 for storing raw key information (corresponding to the weak and strong bits) to be operated on and sent on to the, corresponding key bank. The controller CONT further includes an e/d engine connected to the primary and secondary key banks and is adapted to receive keys from the primary and secondary key banks and encrypt information using the keys provided thereto.

CONT controls the operation of RNG1 and RNG2, wherein RNG2 is sufficiently fast to assure a random choice of the level of attenuation of optical signals sent over the quantum channel to Bob. Also, as in the Alice of FIG. 1A, in the system of FIG. 1B Alice and Bob are also coupled via quantum channel QC that carries the weak and strong optical signals between Bob and Alice, and classical communication channel CCC that connects the respective controllers of Alice and Bob (Bob's controller not shown) and carries both sync and public signals.

QKD System

Figure 1C:
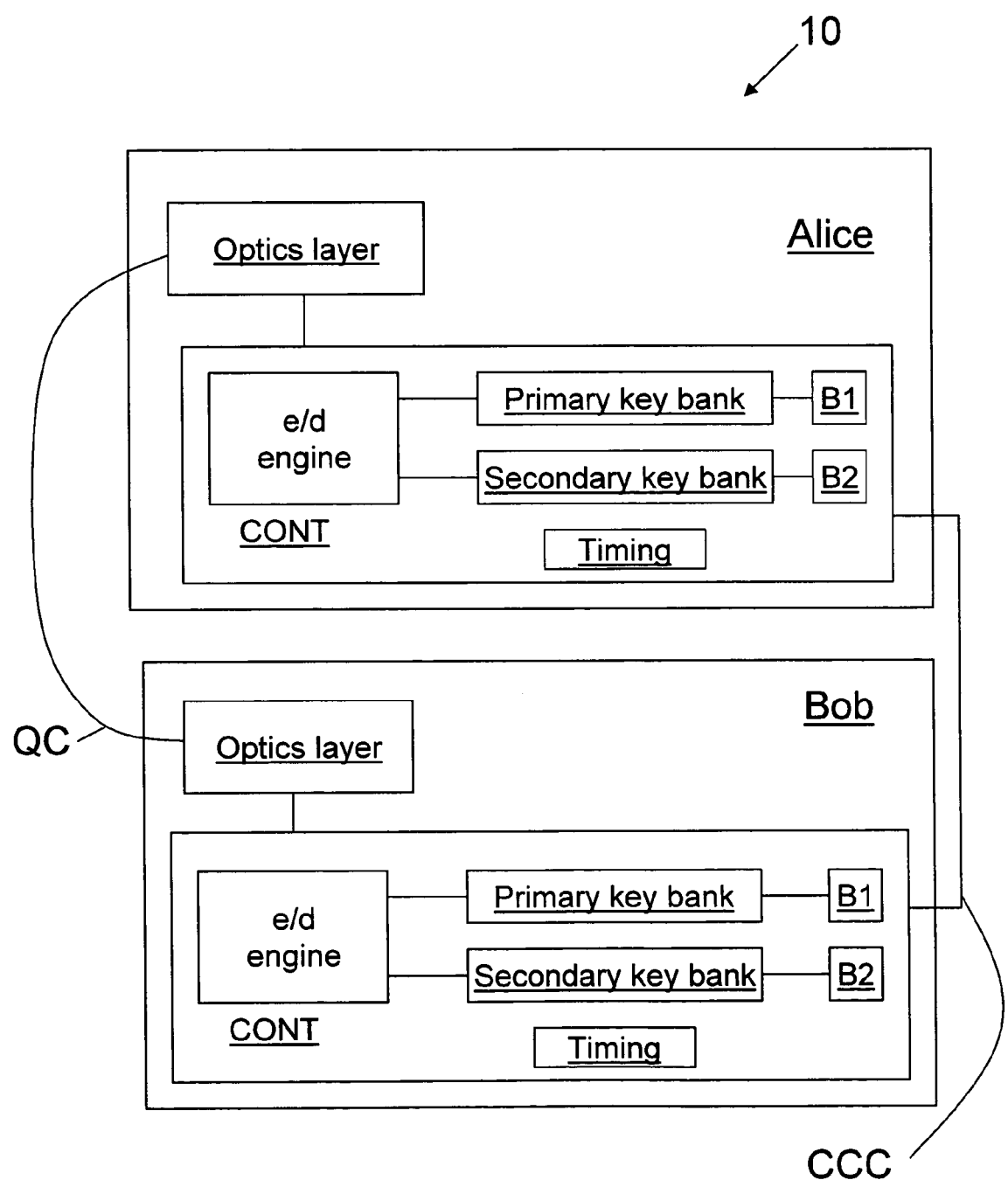
FIG. 1C is a schematic diagram of the general QKD system of the present invention showing both QKD stations Bob and Alice.

FIG. 1C is a schematic diagram of a generalized QKD system 10 according to the present invention, showing both QKD stations Alice and Bob coupled by the quantum channel QC and the classical communication channel CCC. In an example embodiment, the quantum channel and the classical channel are incorporated in the same communication medium, e.g., an optical fiber. Each controller CONT also includes a timing system (TIMING) used to coordinate the timing of the quantum signals. An example timing system is disclosed in PCT patent application serial number PCT/US04/03394. entitled "QKD systems with robust timing," which patent application is incorporated by reference herein.

Both QKD stations include an optics layer. For example, with reference also to FIG. 1A, Alice's optics layer includes the Faraday mirror FM, the phase modulator PM and the electro-absorption modulator (EAM). For the sake of convenience, RNG1 and RNG2 are considered part of the optics layer, though they could also be considered part of the controller electronics.

Likewise, with reference to FIG. 1B, Alice's optics layer includes the laser, the variable optical attenuator VOA1, the phase modulator PM and the electro-absorption modulator EAM, along with RNG1 and RNG2.

In each case, the optics layer is coupled to the controller and to the quantum channel QC, which is preferably an optical fiber.

Security Considerations

The trade-off between system security and key generation rate is now examined. It is typically assumed that a QKD system is designed to survive any type of attack including the most advanced quantum computing attack and the attacks based on the use of sophisticated quantum measurements and/or quantum memory. It is also typically assumed that the key distribution is used in combination with a one-time pad data encryption to encrypt information.

In reality, in most cases the use of one-time pad encryption is overkill, and a less secure encryption option such as AES encryption will suffice. The use of AES with a lower key length to message length ratio greatly increases the capacity of the encrypted channel while keeping the security reasonably high—still much higher than most of the known techniques if used in combination with QKD key generation.

When the security of the encrypted channel is relaxed, the security of the key generation can be relaxed as well. In the simplest case, relaxing the security of the key generation process is done by increasing the mean photon number $\mu$ of pulses sent from Alice to Bob. Quasi-classical protocols can then be used, such as encrypting the process for sifting the bits in the raw key using, for example, the AES e/d engine. Now Eve cannot learn the basis from public discussion (at least momentarily) and cannot learn the bit even if she keeps a copy of the state in her quantum memory because in practice she does not have the computational power to quickly break the AES encrypted classical channel.

This approach represents a reasonable compromise: security is relaxed in both the data encryption process on the classical communication channel CCC and the key exchange process on the quantum channel QC, and the key exchange process is made more secure by adding encryption to the sifting process.

The level of security used typically depends on the particular application involved. For example, steps in the reconciliation protocol such as authentication require a high level of protection where the ultimate security is preferable. However, authentication usually does not require a large number of bits. On the other hand, Alice can increase the mean photon number $\mu$ and thus increase the key generation rate. The keys generated at this stage ("secondary keys"), are less secure, but if Eve compromises this key, she still cannot break the system and put her apparatus in between. Thus, if Alice and Bob become suspicious about the security of their communication link, they always have the option of restarting the system with the use of a fully secure primary key.

Thus, use of secondary keys that are less than perfectly secure serves to increase the key rate but not the distance span (to be precise—not to span the distance over a certain limit—see numerical example below). In the case where Alice and Bob need to communicate beyond the known distance associated with complete security, the system security depends on the computational ability of Eve. In this case, Eve can accumulate her knowledge and break into the system at a certain point using, say, fluctuation of the parameters, Trojan horse attack, etc. This would allow her to interpose herself into the communication channel without Alice and Bob realizing that the security is lost. This case is the most vulnerable to attack by Eve because the strongest point of using QKD is the ability of detecting eavesdropping and the eavesdropper has failed to be detected.

Two Key Bank Architecture

In an example embodiment of the present invention, instead of one key bank, Alice and Bob each use two banks and two corresponding modes of key generation. From the start, the pulses exchanged are weak laser pulses having a mean photon number $\mu 1$ low enough to meet the ultimate security requirement, such as $\mu 1=0.1$. These pulses are used to generate the primary keys. The corresponding keys are stored in the respective primary key banks of Alice and Bob and are used for the most crucial applications, depending on the architecture of the whole system and end-user needs.

To generate the secondary key, Alice and Bob exchange strong quantum pulses having a relatively large mean photon number $\mu 2 > \mu 1$ (e.g., $\mu 2=1$). They store the secondary keys in their respective secondary key banks. The secondary keys are used for less crucial applications, such as encrypting the classical channel (e.g. sifting) and certain final encryption applications where ultimate security is not essential. The existence of the primary key bank guarantees that the QKD system can be restarted without the need of a trusted currier (technician) to break the man-in-the-middle type of attack or in the case of a denial of service shut down.

In an example embodiment, the generation of the primary and secondary keys is performed simultaneously by Alice randomly switching the intensity of the pulses between $\mu 1$ and $\mu 2$ through the operation of the electro-absorption modulator EAM and the random number generator RNG2.

The keys generated with weak pulses having $\mu 1$ serve as the primary keys, and the keys generated with strong pulses having $\mu 2$ serve as the secondary keys. In an example embodiment, this method is optionally coupled with the decoy method of PNS attack detection due to the similarity in requirements (flipping the $\mu$). Surprisingly, splitting the key into primary and secondary keys can help increasing the distance over which the primary keys can be exchanged. This is illustrated immediately below in the numerical analysis section.

Numerical Analysis

The number of sifted bits (i.e., the bits that remain after Alice and Bob discard bits with no clicks, double clicks, and mismatching bases) can be estimated for pulses having mean photon counts of µ1 and µ2. The number of sifted bits ξ in the case where only µ1 is used can be written as:

$$\xi 1 = \tfrac{1}{2} R \eta_F \eta_D \mu 1, \text{ or } \xi 1 = R \eta_F \eta_D \eta_F,$$

since in case of ultimate security $\mu 1 = \eta_F$, where $\eta_F$ is the channel transmittivity, R is a repetition rate, and $\eta_D$ is detectors' quantum efficiency.

In case of random choice between µ1 and µ2 the number of sifted bits ξ can be estimated as $$\xi 2 = \tfrac{1}{2} R \eta_F \eta_D (\mu 1 k 1 + \mu 2 k 2)$$

where k1+k2=1. If $\mu 2 = \eta_F m$, where m>1, then the number of sifted bits becomes:

$$\xi 2 = \tfrac{1}{2} R \eta_F \eta_D \eta_F (k1 + k2\ m).$$

It is seen that the ratio of ξ2 to ξ1 equals (k1+k2 m)>1. This ratio shows that the random choice of µ1 and µ2 assures a higher key generation rate and also allows for the distance of the quantum channel transmission to be increased, since channel transmittivity decreases when the length increases.

Methods of Operation

With reference again to FIGS. 1A and 1B, in an example embodiment, Alice prepares two sets of pulses: weak pulses with a small mean number of photons per pulse µ1 (e.g., 0.1≦µ1≦1, or $\mu 1 = \eta_F$, where $\eta_F$ is the channel transmittivity) for ultimate security, and strong pulses with a relatively large mean number of photons per pulse µ2 (e.g., µ2≈1), or for faster key generation but less security. As mentioned above, both the weak and strong pulses are sent over quantum channel QC coupled to Bob (not shown)

Alice encodes pulses in a standard way (following BB84, for example). But in addition to key and basis information for each pulse, she also includes information as to which pulse was weak and which was strong. She sends weak and strong pulses to Bob over the quantum channel, mixing them randomly via RNG2 so that Eve can't learn which each pulse is weak and which is strong.

Once Alice transmits the pulses to Bob, Bob then detects the pulses in the usual fashion and stores the bits. The reconciliation process is then performed. In one example embodiment, Alice tells Bob over the public channel which pulse was weak and which pulse was strong. They then form two corresponding sets of bits (i.e., two raw keys), which are stored, for example, in respective buffers B1 and B2 in both Alice and Bob.

In an example embodiment, Alice and Bob agree prior to this stage on tags that identify the pulses as weak or strong. After the two raw keys are established, then in an example embodiment they run sifting, error correction and privacy on these two sets independently. According to the status of the system, they can decide which set to process first. For example, if the key managing program shows that the system is short on primary keys, they can first process the key set associated with the weak pulses. When the required level of primary key bank filling is reached, they switch to processing the sets for strong pulses, and vice versa. In another example embodiment, the primary and secondary bit sets are processed in parallel to form the primary and secondary keys.

In another embodiment, the separation of bits corresponding to weak and strong pulses is performed as a part of the sifting process. At this stage, in addition to basis information, Alice tells Bob whether the pulse was weak or strong. From this point, they can run error correction and privacy amplification on either the whole set of bits (i.e., weak and strong pulses not separated), or they can form two sets of bits and process them separately.

After a key is created upon completion of sifting, error correction and privacy amplification, it is placed (e.g., according to its tag) into either the primary key bank (weak pulses) or the secondary key bank (strong pulses).

To assure proper use of the primary and secondary key banks, in an example embodiment each application enters a key management program (discussed below), has a tag that indicates to the key management program whether the particular application requires a key from the primary or secondary key bank. In one example embodiment, by default, authentication is assigned a tag requiring a key from the primary key bank, and other applications (e.g., encrypted bit sifting) are assigned a tag that requires a key from the secondary key bank. In another example embodiment, a user assigns a tag according to his or her preference for a given application.

As an option, Alice and Bob compare the primary and secondary key rates and determine the presence of an eavesdropper using Hwang's protocol, e.g., as described in Hwang's publications entitled "Quantum key distribution with high loss: toward global secure communications," arXiv:quant-ph/021153 v1 and v4 (24 Nov. 2002 and 19 May 2003, respectively).

Figure 2:
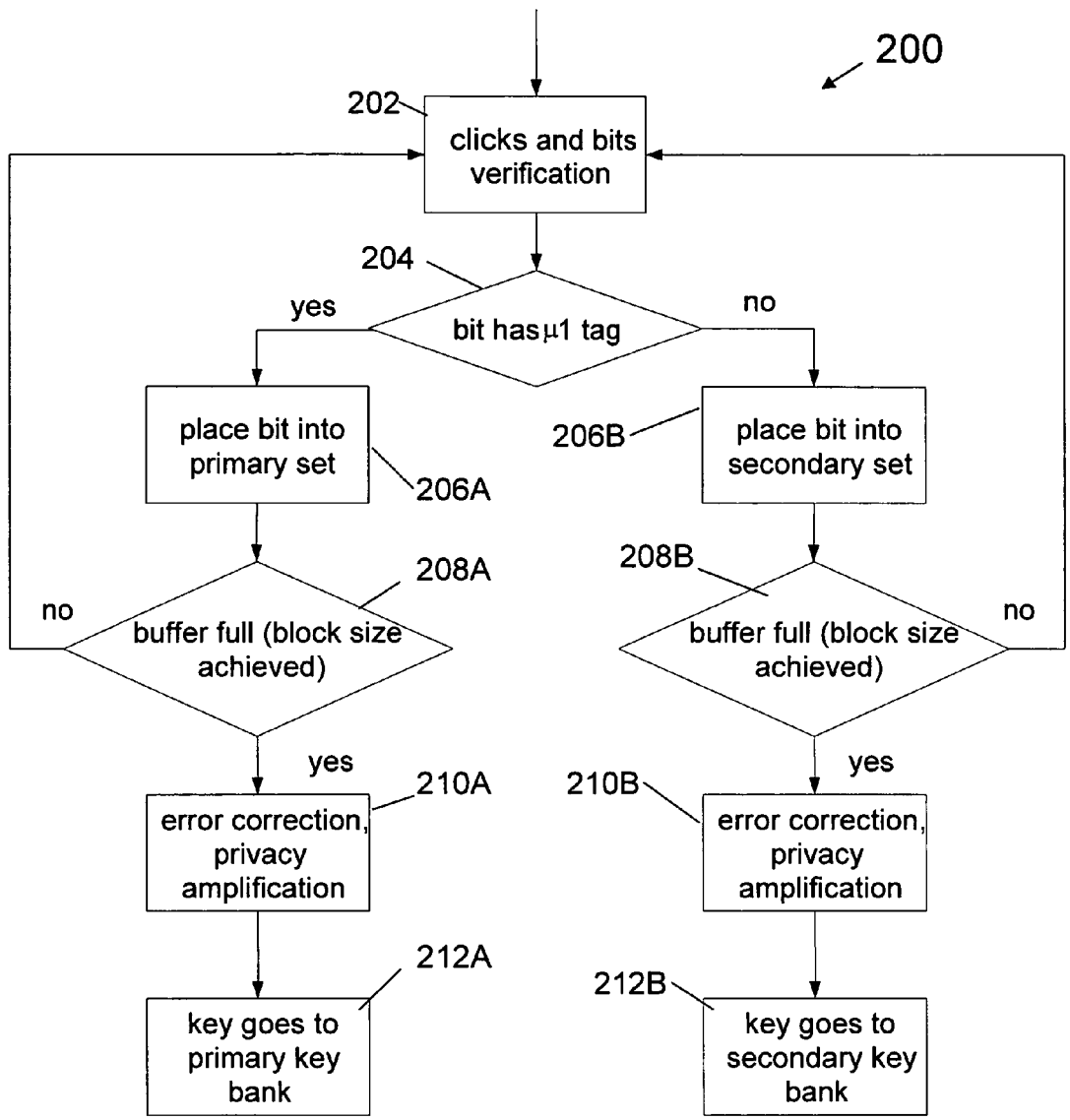
FIG. 2 is a flow diagram illustrating an example embodiment of the method of the present invention for processing

FIG. 2 is a flow diagram 200 illustrating the modified sifting, error correction and privacy amplification stage according to one embodiment of the invention. Box 202 corresponds to the standard sifting procedure under which Alice tells Bob which basis she used for each bit. Bob then discards all bits for which his single photon detector gave no clicks or a double click, and then discards bits with wrong basis. Alice also discards the same bits.

According to one embodiment of the invention, at box 204 Bob and Alice check the tags of each bit, including bits with average photon count µ1. Then, in boxes 206A and 206B, the corresponding bits are placed into the corresponding buffers B1 and B2 in the controller. At boxes 208A and 208B, Alice and Bob perform standard error correction and privacy amplification procedures on the respective key sets. Then, in boxes 210A and 210B, the finalized key for each buffer is sent from primary and secondary buffers B1 and B2 into the corresponding primary and secondary key banks.

Assigning Keys to Different Applications

Figure 3:
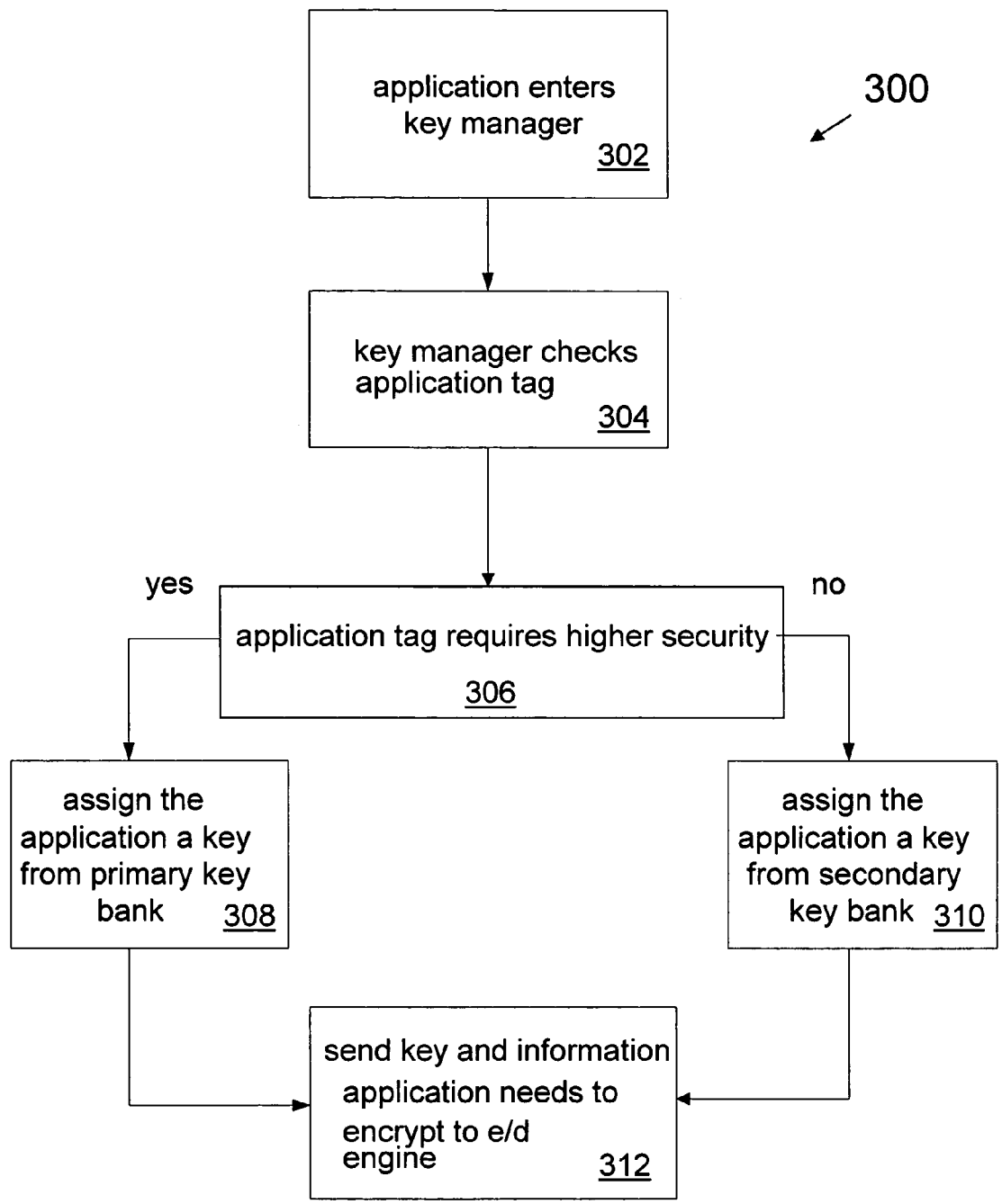
FIG. 3 is a flow diagram illustrating an example embodiment of a method of the present invention for assigning primary and secondary keys to different applications.

FIG. 3 is a flow diagram 300 illustrating an example embodiment of a method for assigning primary and secondary keys to different applications (i.e., select information to be encrypted). In an example embodiment of the invention, controller CONT includes a key manager. In an example embodiment, the key manager is software embodied in a tangible medium such as a processor or storage device such as a hard drive in the controller, that determines what type of application (e.g., authentication, message encryption, encrypted bit sifting, etc.) gets what type of key.

In an example embodiment, the application includes a tag that indicates the type of key (primary or secondary) it should be assigned. Thus, in 302, the particular application enters or is otherwise brought to the attention of the key manager. Then in 304, the key manager checks the application tag. In 306, the key manager determines what type of security the application should be assigned, e.g., by querying whether the application requires high security. In 306, if the query is answered in the affirmative, then in 308 the application is assigned a key from the primary key bank. On the other hand, if the query of 306 is answered in the negative, then in 310 the application is assigned a key from the secondary bank. Then in 312, once a key is assigned, the information to be encrypted and the corresponding key is sent to the e/d engine for encryption. Note that the information from 312 is also shared with Bob's controller, e.g., over the controller communication channel CCC, so that the proper key can be used for decryption by Bob's e/d engine.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. A method of exchanging keys in a QKD system, comprising:
   exchanging a first key between first and second QKD stations using weak pulses having a mean photon number $\mu 1$;
   storing the first key in respective primary key banks in each of the first and second QKD stations;
   exchanging a second key between the first and second QKD stations using strong pulses having a mean photon number $\mu 2 > \mu 1$; and
   storing the second keys in respective secondary key banks in each of the first and second QKD stations.

2. The method according to claim 1, including:
   encrypting a first application using the first key from the primary key bank from the first QKD station; and
   encrypting a second application using the second key from the secondary key bank of the first QKD station.

3. The method according to claim 2, including encrypting said first and second applications by associating said first and second applications to a corresponding key using a key management system.

4. The method according to claim 1, wherein storing the first and second keys in respective primary and secondary key banks in each of the QKD stations includes associating respective tags with the first and second keys, wherein said tags indicate the key bank in which the key is to be stored.

5. The method of claim 1, including:
   performing sifting, and error correction separately on the first and second keys.

6. The method of claim 1, including prior to storing the first and second keys in the primary and secondary key banks in each QKD station:
   placing bits corresponding to the exchanged weak and strong pulses into corresponding primary and secondary buffers in each of the QKD stations, wherein the primary and secondary buffers are coupled to the respective primary and secondary key banks in each QKD station.

7. The method of claim 1, including in the first QKD station:
   forming the weak and strong pulses by passing light pulses from a light source through an electro-absorption modulator capable of providing varying levels of optical attenuation; and
   randomly varying the level of attenuation of the electro-absorption modulator.

8. The method of claim 1, including:
   associating with each weak and strong pulse a corresponding tag indicative of the strength of the pulse; and
   placing bits associated with the exchanged weak and strong pulses into a corresponding buffer in each QKD station based on the corresponding tag.

9. A first station for a QKD system, comprising:
   an optics layer;
   a controller coupled to the optics layer, wherein the controller includes:
   primary and secondary key banks adapted to store primary and second keys formed from exchanging weak and strong pulses with a second QKD station, and an encryption/decryption (e/d) engine coupled to the primary and secondary key banks and adapted to use keys from either of said primary and secondary key banks to encrypt and decrypt information.

10. The station of claim 9, wherein the controller further includes a key management system adapted to assign keys from the primary and secondary key banks to the e/d engine depending on the nature of said information.

11. The station of claim 9, further including primary and secondary buffers respectively couple to the primary and secondary key banks, for respectively storing weak and strong bits exchanged between the first QKD station and the second QKD station.

12. The station of claim 9, wherein the optics layer includes:
    an electro-absorption modulator (EAM); and
    a first random number generator (RNG) coupled to the EAM and to the controller.

13. The station of claim 9, wherein the optics layer further includes in order along an optical axis:
    a light source adapted to emit light pulses;
    a phase modulator (PM) operably coupled to a first RNG;
    an electro-absorption modulator (EAM) operably coupled to a second RNG; and
    wherein the PM and first RNG are adapted to impart a random phase to the light pulses according to a select QKD protocol; and
    wherein the EAM and second RNG are adapted to randomly attenuate the modulated light pulses prior to the modulated light pulses entering a quantum channel.

14. A method of exchanging keys over a quantum channel connecting first and second QKD stations, comprising:
    in the first QKD station (Alice), phase-modulating light pulses according to a QKD protocol;
    randomly varying the level of attenuation of the light pulses to create weak and strong light pulses;
    sending the weak and strong light pulses to the second QKD station (Bob) over the quantum channel;
    phase-modulating the weak and strong light pulses according to the QKD protocol;
    storing bits associated with the weak light pulses in respective primary key banks located in Bob and Alice; and
    storing bits associated with the strong light pulses in respective secondary key banks located in Bob and Alice.

15. The method of claim 14, further including at both Alice and Bob:
    storing weak and strong bits in corresponding primary and secondary buffers coupled to the respective primary and secondary key banks;
    processing the bits stored in the primary and secondary buffers; and
    providing the process bits to the corresponding primary and secondary key banks.

16. The method of claim 14, wherein randomly varying the level of attenuation of the light pulses includes varying the intensity of light pulses between a first mean photon count μ1 and second mean photon count μ2, where μ1<μ2.

17. The method of claim 16, wherein the first mean photon count μ1 is about 0.1 photons per pulse, and the second mean photon count μ2 is about 1 photon per pulse.

18. The method of claim 14, wherein Alice sends Bob information about the strength of each light pulse sent over the quantum channel.

19. The method of claim 14, including performing sifting, error correction and privacy amplification on exchanged bits prior to sending the bits to the corresponding primary and secondary key banks.

20. The method of claim 14, including performing sifting, error correction and privacy amplification on respective sets of weak and strong bits prior to sending the bits to the corresponding primary and secondary key banks.

* * * * *